US009955133B2

(12) United States Patent
Neitz et al.

(10) Patent No.: US 9,955,133 B2
(45) Date of Patent: Apr. 24, 2018

(54) MYOPIA-SAFE VIDEO DISPLAYS

(75) Inventors: Jay Neitz, Seattle, WA (US); James Kuchenbecker, Seattle, WA (US); Maureen Neitz, Seattle, WA (US)

(73) Assignee: UNIVERSITY OF WASHINGTON THROUGH ITS CENTER FOR COMMERCIALIZATION, Seattle, WA (US)

( * ) Notice: Subject to any disclaimer, the term of this patent is extended or adjusted under 35 U.S.C. 154(b) by 0 days.

(21) Appl. No.: 14/110,544

(22) PCT Filed: Apr. 20, 2012

(86) PCT No.: PCT/US2012/034518
§ 371 (c)(1),
(2), (4) Date: Oct. 28, 2013

(87) PCT Pub. No.: WO2012/145672
PCT Pub. Date: Oct. 26, 2012

(65) Prior Publication Data
US 2014/0063347 A1 Mar. 6, 2014

Related U.S. Application Data
(60) Provisional application No. 61/517,520, filed on Apr. 21, 2011.

(51) Int. Cl.
H04N 9/68 (2006.01)
G09G 5/02 (2006.01)
G09G 5/04 (2006.01)
(52) U.S. Cl.
CPC ............... H04N 9/68 (2013.01); G09G 5/02 (2013.01); G09G 5/04 (2013.01);
(Continued)

(58) Field of Classification Search
CPC .... G09G 5/02; G09G 5/04; G09G 2320/0271; G09G 2320/0666; G09G 2340/06; H04N 9/68
(Continued)

(56) References Cited

U.S. PATENT DOCUMENTS 4,183,050 A * 1/1980 Tsuchiya et al. ............. 348/692
4,887,150 A * 12/1989 Chiba ................... H04N 1/6019
358/523

(Continued)

FOREIGN PATENT DOCUMENTS

EP 1469454 10/2004
JP 2005134866 A 5/2005
(Continued)

OTHER PUBLICATIONS

International Preliminary Report on Patentability for PCT/US2012/034518, dated Oct. 31, 2013.
(Continued)

Primary Examiner — Gregory J Tryder
Assistant Examiner — Michael Le
(74) Attorney, Agent, or Firm — McDonnell Boehnen Hulbert & Berghoff LLP

(57) ABSTRACT

In a first aspect, the present invention provides methods for creating video signals including (a) receiving an input video signal including an input red component, an input green component, and an input blue component; (b) determining (i) that a magnitude of the input red component is greater than a magnitude of the input green component and (ii) a differential between the magnitude of the input red component and the magnitude of the input green component; and (c) sending an output video signal including an output red component, an output green component, and an output blue component, where at least one of the following is true: (i) the
(Continued)

output red component is decreased by a fractional amount relative to the input red component based on the differential; and/or (ii) the output green component is increased by a fractional amount relative to the input green component based on the differential, and the output blue component is increased by a fractional amount relative to the input blue component based on the differential.

46 Claims, 8 Drawing Sheets

(52) U.S. Cl.
CPC ............... *G09G 2320/0271* (2013.01); *G09G 2320/0666* (2013.01); *G09G 2340/06* (2013.01)

(58) Field of Classification Search
USPC .......................................... 345/589; 348/554
See application file for complete search history.

(56) References Cited

U.S. PATENT DOCUMENTS

| 2004/0008283 | A1* | 1/2004 | Yang et al. .................. 348/656 |
| 2004/0263456 | A1 | 12/2004 | Miyachi et al. |
| 2005/0132087 | A1* | 6/2005 | Glinski ................. G06F 3/1454 709/238 |
| 2008/0152219 | A1 | 6/2008 | Ramanath et al. |
| 2009/0154805 | A1 | 6/2009 | Cok et al. |
| 2011/0018891 | A1* | 1/2011 | Peng et al. .................... 345/589 |
| 2011/0205259 | A1* | 8/2011 | Hagood, IV ......... G09G 3/2003 345/690 |

FOREIGN PATENT DOCUMENTS

JP 2011-150127 8/2011
WO 2008-139741 A1 11/2008

OTHER PUBLICATIONS

Liu, et al., (2014), "The effects of monochromatic illumination on early eye development in rhesus monkeys" Invest Opthlamol Vis Sci, 55(3): 1901-1909.

* cited by examiner

MYOPIA-SAFE VIDEO DISPLAYS

CROSS-REFERENCE

This application claims priority to U.S. Provisional Patent Application Ser. No. 61/517,520 filed Apr. 21, 2011, incorporated by reference herein in its entirety.

BACKGROUND OF THE INVENTION

Cone cells, or cones, are photoreceptor cells in the retina of the eye that are responsible for color vision. A human eye typically comprises three types of cones, each of which has a response curve (roughly a normal distribution) over a range of wavelengths of light and a peak sensitivity over a particular, smaller range of wavelengths of light. Long wavelength sensitive cones, also referred to as L cones or red cones, respond most intensely to light having long wavelengths: the peak sensitivities of red cones are typically around wavelengths 564-580 nm (greenish-yellow light). Medium wavelength sensitive cones, also referred to as M cones or green cones, respond most intensely to light having medium wavelengths: the peak sensitivities of green cones are typically around wavelengths 534-545 nm (green light). Short wavelength sensitive cones, also referred to as S cones or blue cones, respond most intensely to light having short wavelengths: the peak sensitivities of blue cones are typically around wavelengths 420-440 nm (blue light).

Myopia is a refractive defect of the eye in which light entering the eye produces image focus in front of the retina, rather than on the retina itself. Myopia is often colloquially referred to as nearsightedness. Myopia may be measured in diopters, which is a unit of measurement of the optical power of the eye's lens, equal to the reciprocal of the focal length of the lens.

Television, video games, and computer monitors all cause progression of myopia in children because those displays produce stimuli that cause uneven excitation of the red and green cones. Differential activation of the red and green cones is responsible for the eye elongating abnormally during development, which in turn prevents images from being focused clearly on the retina. Unnatural red stimuli such as those from cathode ray tube (CRT) displays preferentially activate red cones six to eight times more effectively than green cones. The red primaries in CRTs have been matched by all modern display types (liquid crystal displays (LCD), displays that combine liquid crystal displays with light-emitting diodes (LCD/LED), organic LED displays, plasma displays, and digital light processing displays (DLP), to name a few), making virtually all electronic displays prone to causing myopia.

SUMMARY OF THE INVENTION

In a first aspect, the present invention provides methods for creating video signals including (a) receiving an input video signal including an input red component, an input green component, and an input blue component; (b) determining (i) that a magnitude of the input red component is greater than a magnitude of the input green component and (ii) a differential between the magnitude of the input red component and the magnitude of the input green component; and (c) sending an output video signal including an output red component, an output green component, and an output blue component, where at least one of the following is true: (i) the output red component is decreased by a fractional amount relative to the input red component based on the differential; and/or (ii) the output green component is increased by a fractional amount relative to the input green component based on the differential, and the output blue component is increased by a fractional amount relative to the input blue component based on the differential.

In a second aspect, the present invention provides a non-transitory computer-readable medium having program instructions stored thereon that are executable by at least one processor, the program instructions including instructions that cause the processor to perform steps of any embodiment or combination of embodiments of the methods of the first aspect of the invention. For instance, the program instructions may include: (a) instructions for receiving an input video signal including an input red component, an input-green component, and an input-blue component; (b) instructions for determining (i) that a magnitude of the input red component is greater than a magnitude of the input green component and (ii) a differential between the magnitude of the input red component and the magnitude of the input green component; and (c) instructions for sending an output video signal including an output red component, an output green component, and an output blue component, where at least one of the following is true: (i) the output red component is decreased by a fractional amount relative to the input red component based on the differential; and/or (ii) the output green component is increased by a fractional amount relative to the input green component based on the differential, and the output blue component is increased by a fractional amount relative to the input blue component based on the differential.

In a third aspect, the present invention provides circuits for creating video signals, including: (a) a first comparator configured to (i) receive a red component input signal and a green component input signal and (ii) output a red-green differential signal including a difference of the red component input signal and the green component input signal; (b) a second comparator configured to (i) receive the red-green differential signal and an output signal of the second comparator and (ii) output a red-green scaled-differential signal when the red component input signal is of a greater magnitude than the green component input signal; (c) a first adder configured to (i) receive the green component input signal and the red-green scaled-differential signal and (ii) output a green component output signal including a summation of the green component input signal and the red-green scaled-differential signal; and (d) a second adder configured to (i) receive a blue component input signal and the red-green scaled-differential signal and (ii) output a blue component output signal including a summation of the blue component input signal and the red-green scaled differential signal.

In a fourth aspect, the present invention provides devices for creating video signals, including: (a) a comparator unit configured to receive a red component input signal and a green component input signal; compare a magnitude of the red component input signal and a magnitude of the green component input signal; and output a red-green differential signal when the magnitude of the red component input signal is greater than at least the magnitude of the green component input signal; and (b) an adding unit configured to receive (i) the red-green differential signal, (ii) the green component input signal, and (iii) a blue component input signal; output a green component output signal including a summation of the green component input signal and the red-green differential signal; and output a blue component output signal including a summation of the blue component input signal and the red-green differential signal.

DETAILED DESCRIPTION OF THE INVENTION

Figures 1A, 1B:
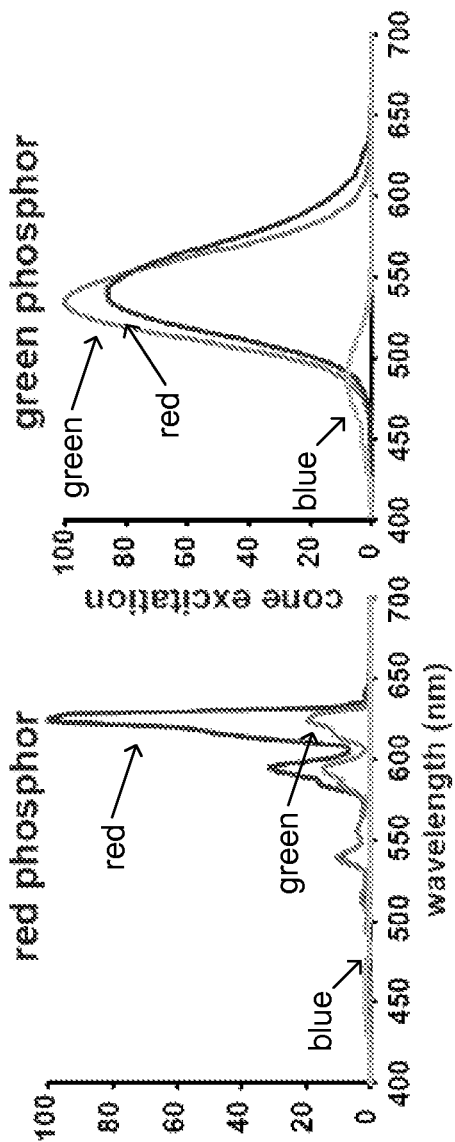
FIG. 1a shows the simultaneous excitation of all three types of cones when exposed to red phosphor stimuli.
FIG. 1b shows the simultaneous excitation of all three types of cones when exposed to green phosphor stimuli.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, $3^{rd}$ Edition or a dictionary known to those of skill in the art, such as the Oxford Dictionary of Biochemistry and Molecular Biology (Ed. Anthony Smith, Oxford University Press, Oxford, 2004).

As used herein and unless otherwise indicated, the terms "a" and "an" are taken to mean "one", "at least one" or "one or more". Unless otherwise required by context, singular terms used herein shall include pluralities and plural terms shall include the singular.

All embodiments disclosed herein can be used in combination, unless the context clearly dictates otherwise.

In a first aspect, the present invention provides methods for creating video signals comprising:
(a) receiving an input video signal comprising an input red component, an input green component, and an input blue component;
(b) determining (i) that a magnitude of the input red component is greater than a magnitude of the input green component and (ii) a differential between the magnitude of the input red component and the magnitude of the input green component; and
(c) sending an output video signal comprising an output red component, an output green component, and an output blue component,
wherein at least one of the following is true:
(i) the output red component is decreased by a fractional amount relative to the input red component based on the differential; and/or
(ii) the output green component is increased by a fractional amount relative to the input green component based on the differential, and the output blue component is increased by a fractional amount relative to the input blue component based on the differential.

The methods can be used with any electronic displays that utilize the signals of standard video (i.e.: Red, Green, Blue (RGB)). Exemplary such video displays include, but are not limited to, cathode ray tube (CRT) displays, liquid crystal displays (LCD), light-emitting diodes (LED), displays that combine LCDs with LEDs (LCD/LED), organic LED displays, plasma displays, and digital light processing displays (DLP), among other examples.

The inventors have demonstrated that the difference in excitation levels of red and green cones when presented with red stimuli can induce myopia. Television, video games, and computer monitors all cause progression of myopia in children because those displays produce stimuli that cause uneven excitation of the red and green cones. Differential activation of the red and green cones is responsible for the eye elongating abnormally during development, which in turn prevents images from being focused clearly on the retina. Unnatural red stimuli such as those from cathode ray tube (CRT) displays preferentially activate red cones six to eight times more effectively than green cones.

For instance, FIG. 1a shows the simultaneous excitation of all three types of cones when exposed to red phosphor stimuli. More particularly, FIG. 1a represents the absorption spectra of red, green, and blue cones multiplied by typical spectral emissions from a CRT monitor. As can be seen, the red cones are excited to a relatively large degree in FIG. 1a. Similarly, FIG. 1b shows the simultaneous excitation of all three types of cones when exposed to green phosphor stimuli. More particularly, FIG. 1b also represents the absorption spectra of red, green, and blue cones multiplied by typical spectral emissions from a CRT monitor. As can be seen, the green cones are excited to a relatively large degree in FIG. 1b.

Color displays cause myopia by producing a difference in activity between red cones (also called long wavelength sensitive cones) and green cones (also called middle wavelength sensitive cones). In children and young adults whose eyes are still developing, differences in activity between neighboring cones signal the eye to grow in length. Overstimulation of the eye with images that produce activity differences between neighboring cones cause the eye to grow too long resulting in near sightedness. The amount of eye growth is proportional to the magnitude of the differences in activity between cones. The red primaries in CRTs have been matched by modern display types (including but not limited to LCD, LCD/LED, organic LED displays, plasma displays, and DLP), making virtually all electronics displays prone to causing myopia.

Thus, using the methods of the present invention to reduce the difference in excitation levels of red and green cones can cause video displays to be more myopia-safe. Since viewers perceive red even when the difference between red and green cone excitation is greatly reduced (but red cones are still excited in excess of green cones), a display can be altered such that the reds are desaturated without losing the basic coloring of the original display.

The methods and myopia safe displays of the present invention produce a video output that reduces the activity differences between L and M cones produced by the display compared to a standard display, while having minimal impact on the viewing experience. This is achieved by desaturating the red colors in the display.

Red colors produce large activities in L cones but little activity in M cones and produce the largest activity differences between L and M cones. Saturation or more formally, excitation purity, is defined here as the difference between a color and white along a line in the International Commission on Illumination 1931 color space (ICE 1931) chromaticity diagram in which all colors have the same hue. White is, by definition, the color that produces equal activity in all three cone types. Saturation is defined in terms of additive color mixing, and has the property of being proportional to any scaling along a line in color space centered at white. The closer to white a color is the more desaturated it is, the smaller the differences in L and M cone activity and the less myopia inducing it is. However, color space is nonlinear in terms of psychophysically perceived color differences. The red color of video displays can be desaturated to drastically reduce the myopia-genic properties of the display with only modest changes in the perceptual experience. Combining any color with its complementary color produces white. If an amount of the complementary color that is less than the amount needed to make white is added, a desaturated version of the color results.

The "input video signal" for a particular pixel (or, for analog video signals, the pixel equivalent) in a particular video frame comprises red, green, and blue components. The methods of the invention comprise determining (i) that an intensity of the red component is greater than an intensity of the green component; and (ii) a differential between the intensity of the red component and the intensity of the green component. Once the differential is determined a modified output video signal is generated in which some of the red color is desaturated to replace the original color with one less likely to induce myopia. This is done by at least one of the following processes:
  (i) the output red (R) component is decreased by a fractional amount relative to the input red component based on the differential; and/or
  (ii) the output green (G) component is increased by a fractional amount relative to the input green component based on the differential, and the output blue (B) component is increased by a fractional amount relative to the input blue component based on the differential Whenever the intensity of R>G the saturation, and the potential for causing myopia can be reduced either by reducing the intensity of R or increasing the intensity of G. However, increasing the intensity of G alone will shift the hue toward yellow, and thus it is preferred to increase the intensity of both the blue and green components to maintain as constant a hue experience as possible. Increasing the intensity of B along with G moves the color toward white since R=G=B makes white, which is the most desaturated color. Thus, in one preferred embodiment, the method comprises desaturating the red component by increasing the output green component by a fractional amount relative to the input green component based on the differential and increasing the output blue component by a fractional amount relative to the input blue component based on the differential. In one further embodiment, the output green component and the output blue component are increased by the same fractional amount. Ideally, for most viewing conditions, the goal is to reduce the saturation of the red colors in the image without changing their hue or brightness. This is mainly achieved by increasing G and B equally. In another further embodiment, the output green component and the output blue component are increased by different, respective, fractional amounts. Increasing B more than G or G more than B might be done to optimize the reduction of the potential for inducing myopia and to maximize the viewing experience.

In these various embodiments, a further embodiment is that the output red component is not modified relative to the input red component. Alternatively, the output red component may be decreased by a fractional amount relative to the input red component based on the differential.

In a still further embodiment of any embodiment herein, the output red (R) component is decreased by a fractional amount relative to the input red component based on the differential, where the B and G components are not modified. Decreasing the R-G differential by decreasing R will tend to make the color darker (decreasing its brightness), and may be done in some circumstances to optimize the reduction of the potential for inducing myopia and to maximize the viewing experience.

In each of these embodiments, the methods comprise changing an output component intensity by some fractional amount of the R-G differential, when R is greater than G. When R-G is less than or equal to zero R, G and B are unchanged. When R-G is greater than zero, then G and B are increased by a percentage of R-G, and/or R is decreased by a percentage of R-G. Any suitable percentage can be used as is determined appropriate for a given system and a desired level of protection against myopia. Small percentages (e.g., up to and including 25% to 45%) make the display safer and have little perceptual effect on viewing experience, while larger percentages (e.g., including 46% to 80% and greater) could make the display completely myopia safe but with some cost in terms of realism of the displayed image.

In a further preferred embodiment of any of the embodiments disclosed above, or combinations thereof, the method of any one of claims 1-6, step (c) (i.e.: modification of the output signal) is carried out only if the R-G differential is greater than a predetermined threshold. As one example of such a predetermined threshold, the predetermined threshold may be set equal to 30% of R. In such a case, G must be less than or equal to 70% of R for the method to be carried out.

In a second aspect, the present invention provides a non-transitory and/or physical computer-readable medium having program instructions stored thereon that are executable by at least one processor, the program instructions comprising instructions that cause the processor to perform steps of any embodiment or combination of embodiments of the methods of the first aspect of the invention. For instance, the program instructions may comprise:
  (a) instructions for receiving an input video signal comprising an input red component, an input-green component, and an input-blue component;
  (b) instructions for determining (i) that a magnitude of the input red component is greater than a magnitude of the input green component and (ii) a differential between the magnitude of the input red component and the magnitude of the input green component; and
  (c) instructions for sending an output video signal comprising an output red component, an output green component, and an output blue component, wherein at least one of the following is true:
  (i) the output red component is decreased by a fractional amount relative to the input red component based on the differential; and/or
  (ii) the output green component is increased by a fractional amount relative to the input green component based on the differential, and the output blue component is increased by a fractional amount relative to the input blue component based on the differential.

The computer-readable media can be used with any electronic display that utilizes the signals of standard video (i.e.: Red, Green, Blue (RGB)). Exemplary such video displays include, but are not limited to, cathode ray tube (CRT) displays, liquid crystal displays (LCD), light-emitting diodes (LED), displays that combine LCDs with LEDs (LCD/LED), organic LED displays, plasma displays, and digital light processing displays (DLP).

As used herein the term "non-transitory and/or physical computer readable medium" includes magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable media, which exist exclusively on the processing system or which may be distributed among multiple interconnected processing systems that may be local or remote to the processing system.

Figure 7:
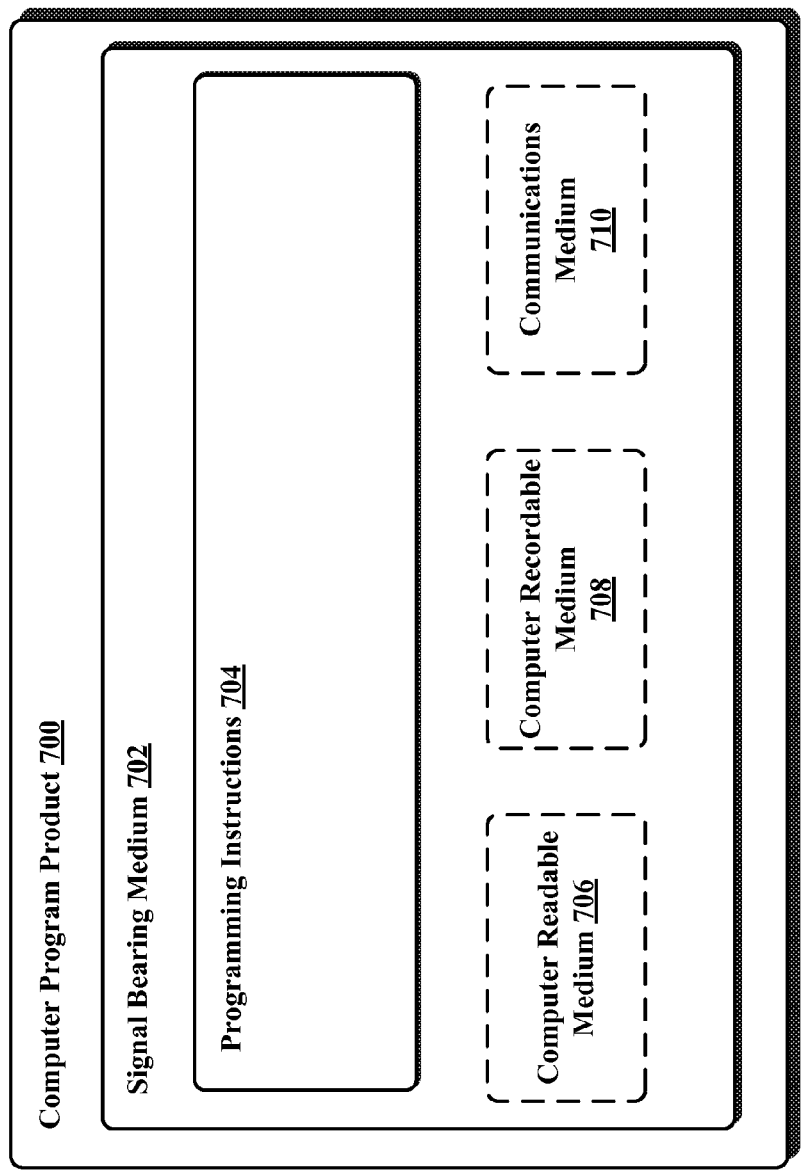
FIG. 7 depicts an example computer-readable medium, in accordance with an example embodiment.

FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors may provide functionality or portions of the functionality described herein with respect to FIGS. 1-6. In some examples, the signal bearing medium 702 may encompass a computer-readable medium 706, such as, but not limited to, a hard disk drive, a Compact Disc (CD), a Digital Video Disk (DVD), a digital tape, memory, etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the signal bearing medium 702 may be conveyed by a wireless form of the communications medium 710.

The one or more programming instructions 704 may be, for example, computer executable and/or logic implemented instructions. In some examples, a computing device such as the computer system 600 of FIG. 6 (discussed further below) may be configured to provide various operations, functions, or actions in response to the programming instructions 704 conveyed to the computer system 600 by one or more of the computer readable medium 706, the computer recordable medium 708, and/or the communications medium 710.

The non-transitory and/or physical computer readable medium could also be distributed among multiple data storage elements, which could be remotely located from each other. The computing device that executes some or all of the stored instructions could be a computer system, such as computer system 600 illustrated in FIG. 6. Alternatively, the computing device that executes some or all of the stored instructions could be another computing device, such as a server.

In a third aspect, the present invention provides circuits for creating video signals, comprising:
  a first comparator configured to (i) receive a red component input signal and a green component input signal and (ii) output a red-green differential signal comprising a difference of the red component input signal and the green component input signal;
  a second comparator configured to (i) receive the red-green differential signal and an output signal of the second comparator and (ii) output a red-green scaled-differential signal when the red component input signal is of a greater magnitude than the green component input signal;
  a first adder configured to (i) receive the green component input signal and the red-green scaled-differential signal and (ii) output a green component output signal comprising a summation of the green component input signal and the red-green scaled-differential signal; and
  a second adder configured to (i) receive a blue component input signal and the red-green scaled-differential signal and (ii) output a blue component output signal comprising a summation of the blue component input signal and the red-green scaled differential signal.

The red-green differential signal received by the first adder and the second adder may be a varied red-green differential signal and the circuit may further include a resistive element configured to receive the red-green differential signal and output the varied red-green differential signal. The resistive element may be one of a static resistor, a variable resistor, a rheostat, a variable potentiometer, and a digitally programmable resistor. And, each, or any of, the first comparator, the second comparator, the first adder, and the second adder may be a respective differential amplifier. In an embodiment, the second comparator may be a feedback differential amplifier.

The circuit may further include a subtractor configured to (i) receive the red component input signal and the red-green scaled-differential signal and (ii) output a red component output signal comprising a difference of the red component input signal and the red-green scaled-differential signal. The subtractor may be a differential amplifier.

As will be understood by those of skill in the art, the circuit may include additional and/or alternative circuit elements necessary to achieve any particular desired functionality, including any of the functionality described above with respect to the first aspect. As but a few examples, the circuit may include additional static resistive elements, variable resistive elements, direct-current power sources, alternating-current power sources, and/or differential amplifiers.

The third aspect of the invention is discussed further below with respect to FIG. 4.

In a fourth aspect, the present invention provides devices for creating video signals, comprising:
  a comparator unit configured to:
    receive a red component input signal and a green component input signal;
    compare a magnitude of the red component input signal and a magnitude of the green component input signal; and output a red-green differential signal when the magnitude of the red component input signal is greater than at least the magnitude of the green component input signal; and an adding unit configured to:
  receive (i) the red-green differential signal, (ii) the green component input signal, and (iii) a blue component input signal;
  output a green component output signal comprising a summation of the green component input signal and the red-green differential signal; and
  output a blue component output signal comprising a summation of the blue component input signal and the red-green differential signal.

The comparator unit may operate according to the comparator functionality described above with respect to the first aspect of the invention, and/or may be implemented using any suitable aspects of the circuitry, computing device, or computer readable medium described above with respect to the second and third aspects of the invention discussed above. Thus, the comparator unit may include the comparators described above with respect to the third aspect of the invention.

Further, the adding unit may operate according to the adding functionality described above with respect to the first aspect of the invention, and/or may be implemented using any suitable aspects of the circuitry, computing device, or computer readable medium described above with respect to the second and third aspects of the invention discussed above, respectively. Thus, the adding unit may include the adders described above with respect to the third aspect of the invention.

The comparator may output the red-green differential signal when the magnitude of the red component input signal is greater than the sum of the magnitude of the green component input signal and a threshold value. The red-green differential signal received by the adding unit may be a varied red-green differential signal and the device may also include a scaling unit configured to receive the red-green differential signal and output the varied red-green differential signal. The scaling unit may include at least one of a static resistor, a variable resistor, a rheostat, a variable potentiometer, and a digitally programmable resistor.

The device may further include a display unit such as at least one of a cathode ray tube (CRT) display, a liquid crystal display (LCD), a light-emitting diode (LED) display, an organic LED display, a plasma display and a digital light processing (DLP) display. In an embodiment, the display device may be configured to receive at least one of (i) the red component input signal, (ii) the blue component output signal, and (iii) the green component output signal and to display the received at least one of (i) the red component input signal, (ii) the blue component output signal, and (iii) the green component output signal.

In an alternative embodiment, the device may further include a subtracting unit configured to receive (i) the red-green differential signal and (ii) the red component input signal and to output a red component output signal comprising a difference of the red component input signal and the red-green scaled-differential signal. In such an embodiment, the display device may be configured to receive at least one of (i) the red component output signal, (ii) the blue component output signal, and (iii) the green component output signal and to display the received at least one of (i) the red component output signal, (ii) the blue component output signal, and (iii) the green component output signal.

The fourth aspect of the invention is discussed further below with respect to FIG. 5.

EXAMPLES

Figure 8:
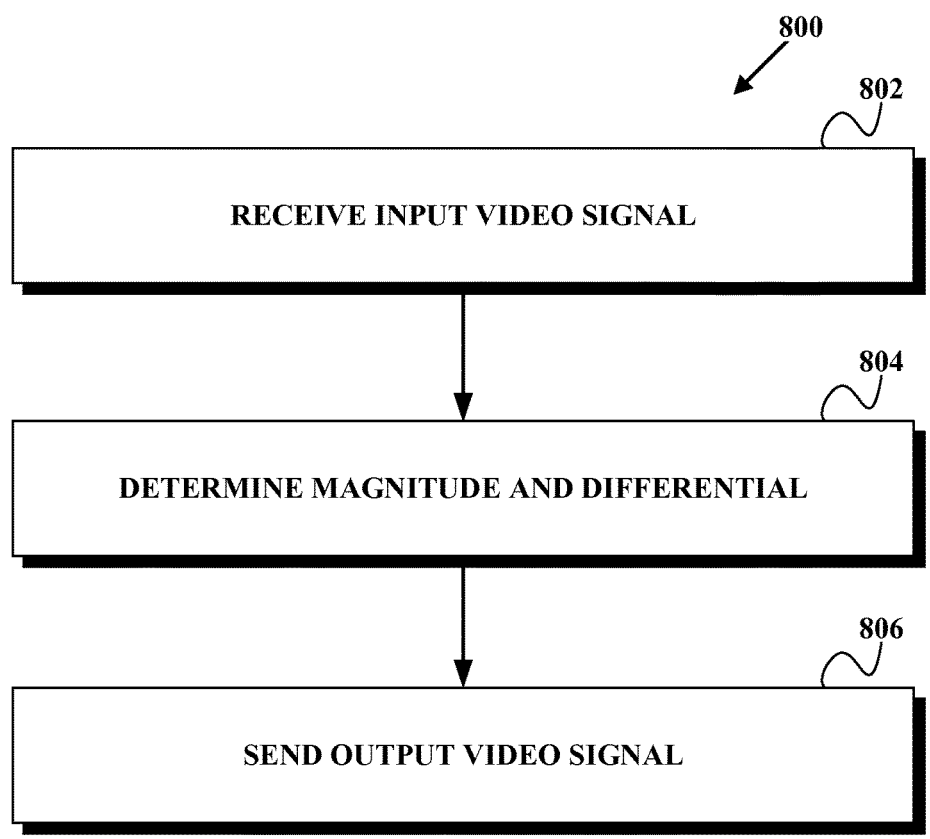
FIG. 8 is a flow chart illustrating an example method, in accordance with an example embodiment.

FIG. 8 is a flow chart illustrating an example method 800 for creating myopia-safe video signals. At step 802, method 800 involves receiving an input video signal comprising an input red component, an input green component, and an input blue component. At step 804, method 800 involves determining (i) that a magnitude of the input red component is greater than a magnitude of the input green component and (ii) a differential between the magnitude of the input red component and the magnitude of the input green component. And at step 806, method 800 involves sending an output video signal comprising an output red component, an output green component, and an output blue component. In accordance with step 806, at least one of the following is true: (i) the output red component is decreased by a fractional amount relative to the input red component based on the differential; and/or (ii) the output green component is increased by a fractional amount relative to the input green component based on the differential, and the output blue component is increased by a fractional amount relative to the input blue component based on the differential.

Figure 2:
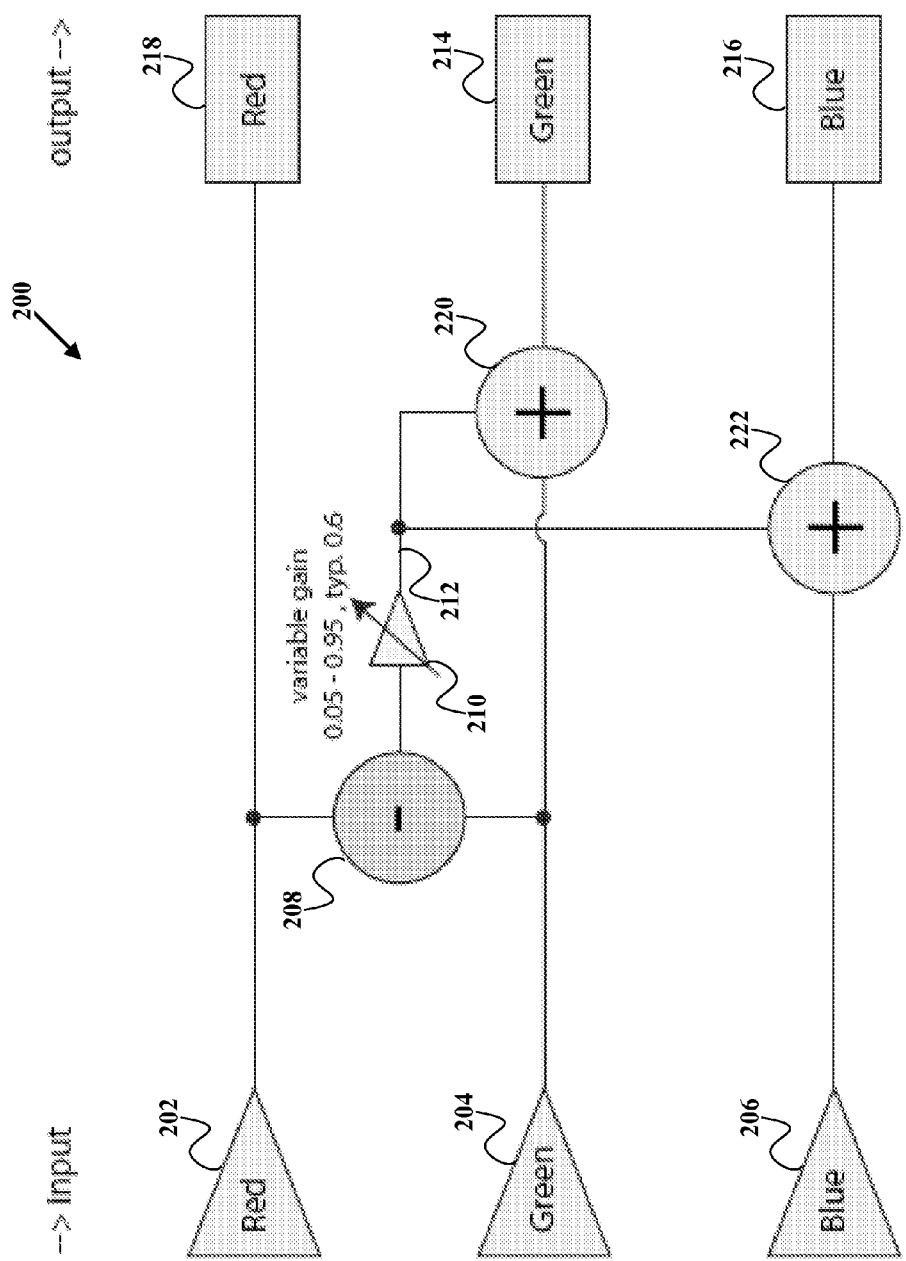
FIG. 2 is a schematic of an example circuit, in accordance with an example embodiment.

As will be discussed further, FIG. 2 is an example schematic of an example circuit 200 that may be implemented to carry out example method 800. Method 800 may be carried out by other circuits, devices, and/or components thereof as well. As is the case with many display types, the example schematic of FIG. 2 has three components, segregated by color: red, green, and blue.

Returning to method 800, at step 802, method 800 involves receiving an input video signal comprising an input red component, an input green component, and an input blue component. The method analyzes those three input components and adjusts them to create a myopia-safe display. Herein, the phrase "myopia-safe" refers to any appreciable reduction in the risk of myopia that a stimuli projects—it does not necessarily correspond to a complete lack of risk of myopia. Input red component 202, input green component 204, and input blue component 206 are shown in example circuit schematic 200.

At step 804, method 800 involves determining (i) that a magnitude of the input red component is greater than a magnitude of the input green component and (ii) a differential between the magnitude of the input red component and the magnitude of the input green component. In accordance with step 804, the method first differences the red and input green channels (R−G), or differences input red component 202 and input green component 204. Such a difference may be accomplished by differencing element 208. When the input green component 204 is of greater magnitude than the input red component 202 (G>R or R−G<0), there is no danger of inducing myopia, and therefore, no change in the output is needed. Similarly, when a positive difference between input red component 202 and the green input component 204 exists, but is small (meaning the stimuli are near yellow, gray, black, or white, colors which produce nearly equal activities in the L (red) and M (green) cones and do not induce myopia), no change is required.

However, when a positive difference between input red component 202 and input green component 204 exists, and is large (or greater than some threshold value), there is a danger of inducing myopia. The method then comprises determining an appropriately scaled differential based on the R−G difference. In one embodiment, to accomplish this, the method sends the determined differential through a variable gain element 210 to determine an appropriately scaled differential.

At step 806, method 800 involves sending an output video signal comprising an output red component, an output green component, and an output blue component. In accordance with step 806, at least one of the following is true: (i) the output red component is decreased by a fractional amount relative to the input red component based on the differential; and/or (ii) the output green component is increased by a fractional amount relative to the input green component based on the differential, and the output blue component is increased by a fractional amount relative to the input blue component based on the differential.

Accordingly, as shown in circuit schematic 200, the system sends the red-green differential signal 212 to both the output green component 214 and the output blue component 216. The output green component 214 and the output blue component 216 are then incremented by the red-green differential signal 212, in an amount proportional to the R–G difference.

In an embodiment, the output red component 218 remains the same as the input red component. That is, the output red component 218 is not decreased by the fractional amount relative to the input red component 202. Such an arrangement is depicted in example circuit schematic 200. In an alternative embodiment, the output red component may be decreased by a fractional amount relative to the input red component based on the differential. According to such an embodiment, the red component may include a subtractor configured to subtract the differential 212 from the input red component 202.

As disclosed herein, other embodiments involve decreasing the red component, increasing the green and blue components by different amounts, and combinations thereof. For instance, the output green component 214 may be increased by a fractional amount relative to the input green component 204 based on the differential 212 and the output blue component 216 may be increased by a fractional amount relative to the input blue component 206 based on the differential 212. In an embodiment the output green component 214 and the output blue component 216 are increased by the same fractional amount. In such an embodiment, adder 220 and adder 222 may be configured similarly.

In an alternative embodiment, the output green component 214 and the output blue component 216 are increased by different, respective, fractional amounts. In such an embodiment, adder 220 and adder 222 may be configured differently so as to cause the desired different increases.

The incrementing of the green and blue channels (or components) corresponds to an increase of the green and blue components that are eventually displayed, which "desaturates" the red color (i.e., brings it closer to white) and reduces the differential activity of the L (red) and M (green) cones. For a typical red stimuli, the difference in activity between L and M cones is much greater than is needed to produce a red percept. That is, though there is an 80% differential between the excitation of green cones and red cones in the presence of light emitted by the red phosphor, a person would still perceive the stimuli as "red" if the excitation of the green cones were increased to be much closer than, but still short of, that of the red cones. Therefore, a viewer can tolerate a large amount of red "desaturation" before a significant degradation in the red color (or hue) is perceived. Thus, the myopia producing difference between L and M cones is reduced by addition of the scaled differential to the green and blue channels without much perceived loss in the quality of the color display.

Figure 3B:
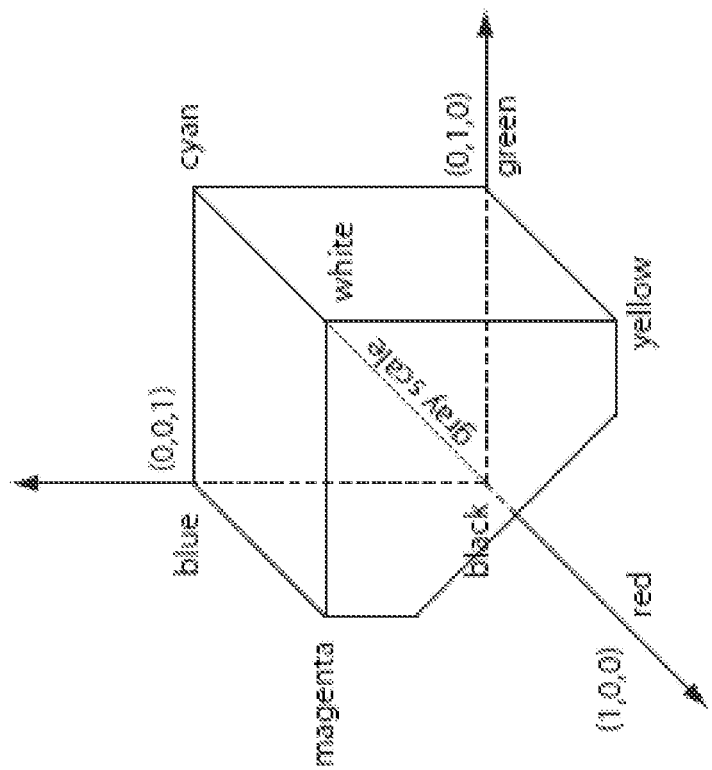
FIG. 3b shows a model unit cube representing an exemplary myopia-safe display.
Figure 3A:
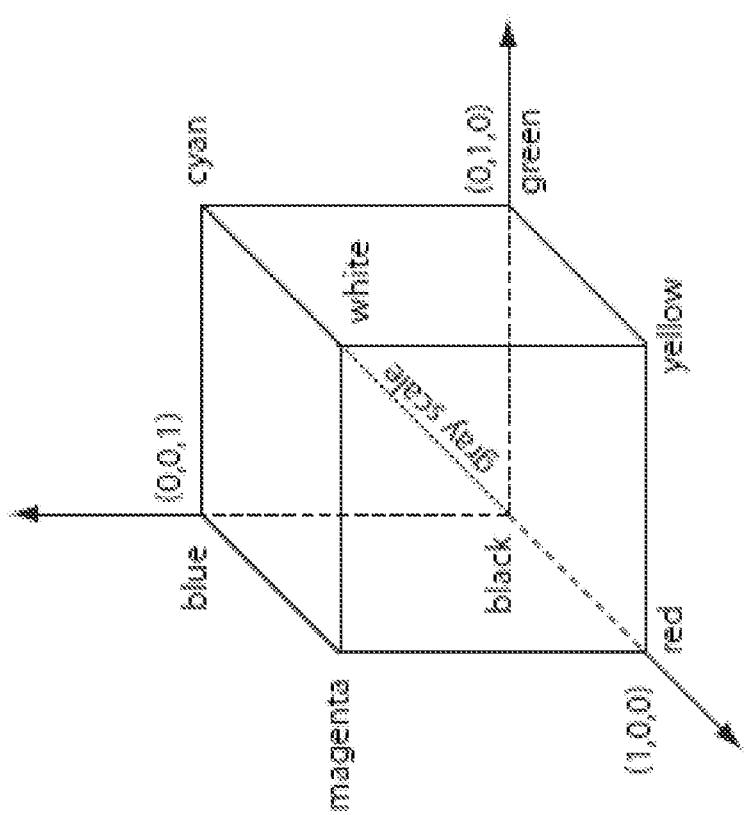
FIG. 3a shows a model unit cube representing a standard RGB display.

FIG. 3a shows a model unit cube representing a standard red, green, and blue (RGB) color model display. The standard RGB model of FIG. 3a is a unit cube situated on three axes: red, green, and blue. The RGB model or display is capable of rendering all colors within the unit cube, and each point within the cube represents a renderable color. The coordinates of a point represent the intensities of each primary axis color in rendering the color of the point. For example, the colors red, green, and blue are points at the corners (1, 0, 0), (0, 1, 0), and (0, 0, 1) respectively. Black is at (0, 0, 0), white is at (1, 1, 1), and grays are any equal combination of the three primaries (e.g. (0.5, 0.5, 0.5) or (0.13, 0.13, 0.13)). These grays are represented by a straight line, labeled gray scale, which passes through both the black (origin) and the white (1, 1, 1) points. All achromatic lights—black, white, and all levels of gray—lie along this line, and it can therefore be referred to as the "achromatic line." Cyan (0, 1, 1) is the combination of green and blue with no red; magenta (1, 0, 1) is the combination of blue and red with no green; and yellow (1 1, 0) is the combination of red and green with no blue.

FIG. 3b shows the model unit cube of FIG. 3a, as it would be altered in a system of the present invention, for example after the implementation of the method described in reference to FIG. 8 and FIG. 2. The system modifies a typical RGB system so that when reds are presented alone, a portion of their energy is diverted into both the green and blue channels, moving the color closer to the achromatic line. (The respective red, green, and blue coordinates may be thought of as relative intensities, such that where the red channel intensity remains constant and the blue and green intensities are increased, a corresponding point in the cube would move positively along the green and blue axes.) However, since the amount of energy diverted to the other channels is a fraction (between zero and one) multiple of the red channel, reds appear pink rather than achromatic FIG. 4 shows an example analog circuit 400, which is one implementation of the circuit of the invention. Such a circuit 400 would be interposed between a device that produces an analog video output, such as a computer, and an analog color video display. This circuit has been built and operates as expected to adjust myopia-unsafe displays so that they become myopia-safe displays. The analog circuit implements aspects of the algorithm explained with reference to FIG. 8 and FIG. 2 above.

As a general matter, the triangles are differential amplifiers or other electrical comparators that, in certain configurations, can add, difference, apply a gain, or pass voltages. Various comparators, adders and subtractors are discussed below; in an embodiment one or more of the first comparator, the second comparator, the first adder, the second adder, and/or the subtractor may be a respective differential amplifier.

First comparator 408 is configured to (i) receive a red component input signal 402 and a green component input signal 404 and (ii) output a red-green differential signal 416 comprising a difference of the red component input signal 402 and the green component input signal 404. In other words, first comparator 408 differences the red component input signal 402 and the green component input signal 404.

Second comparator 414 is configured to (i) receive the red-green differential signal 416 and an output signal of the second comparator 414 and (ii) output a red-green scaled-differential signal (output signal 418) when the red component input signal 402 is of a greater magnitude than the green component input signal 404.

In an embodiment, a resistive element 420 is configured to receive the red-green differential signal 416 and output a varied red-green differential signal (output of resistive element 420). The resistive element 420 may be one of a static resistor, a variable resistor, a rheostat, a variable potentiometer, and a digitally programmable resistor, among other examples of potential resistive elements. When resistive element 420 is a variable resistive element, the red-green differential signal may be varied on a real-time and/or dynamic basis.

If the red component input signal 402 is greater than the green component input signal 404 (or greater than the green component input signal 404 plus a threshold value), the differential signal 416 is added to the green component input signal 404 and the blue component input signal 406. Accordingly, first adder 410 is configured to (i) receive the green component input signal 404 and the red-green scaled-differential signal 418 and (ii) output a green component output signal 422 comprising a summation of the green component input 404 signal and the red-green scaled-differential signal 418. And a second adder 412 is configured to (i) receive a blue component input signal 406 and the red-green scaled-differential signal 418 and (ii) output a blue component output signal 424 comprising a summation of the blue component input signal 406 and the red-green scaled differential signal 418.

Figure 4:
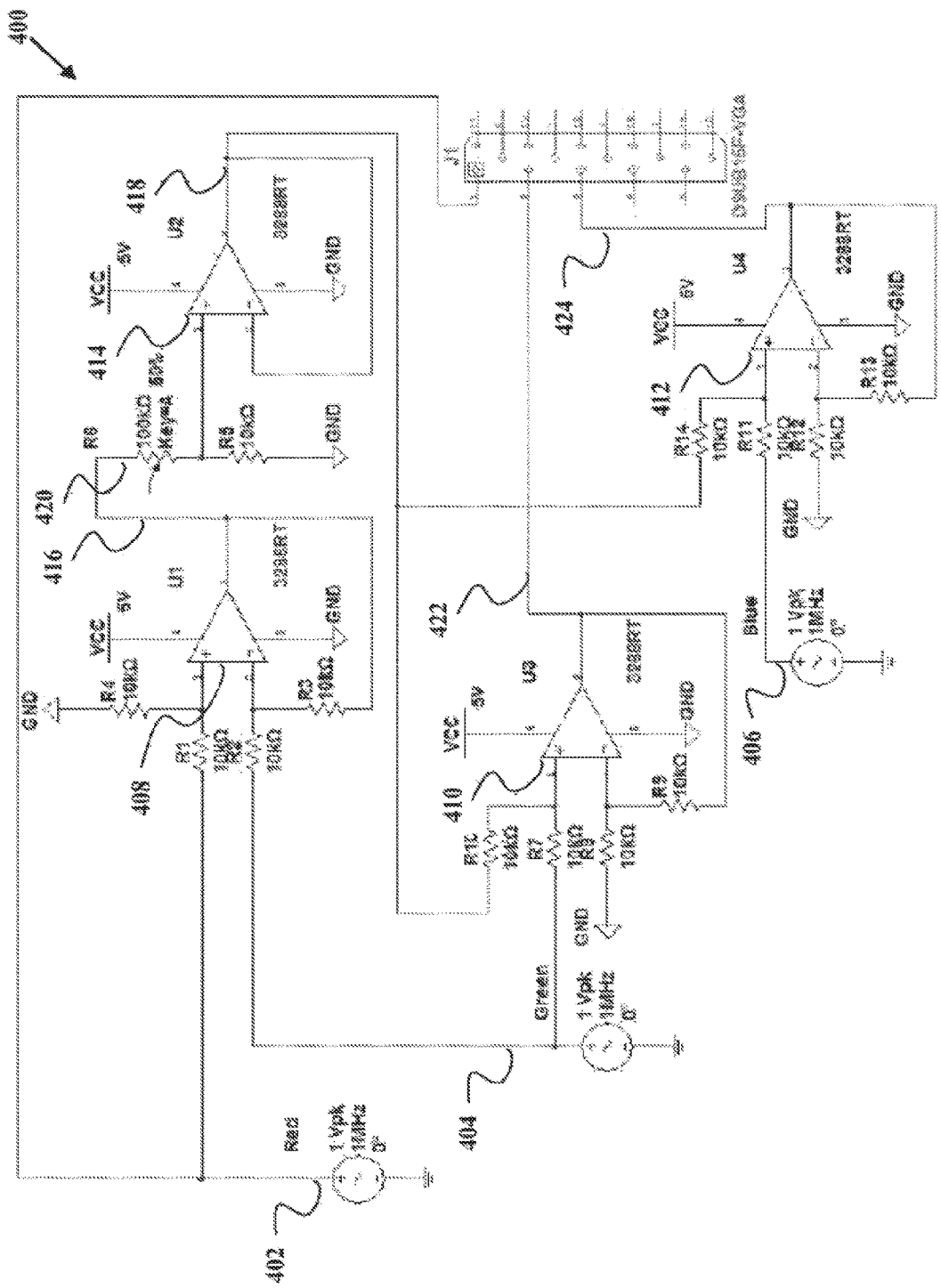
FIG. 4 shows an analog circuit, in accordance with an example embodiment.

The example circuit shown in FIG. 4 does not adjust red component input signal 402, however this is not necessary. In other embodiments, red component input signal 402 may be adjusted as well. More particularly, the circuit may also include a subtractor configured to (i) receive the red component input signal 402 and the red-green scaled-differential signal 418 and (ii) output a red component output signal comprising a difference of the red component input signal and the red-green scaled-differential signal.

While FIG. 4 provides the schematic of one example circuit 400, it should be understood that example circuit 400 is provided for purposes of example and explanation only and should not be taken to be limiting. Alternatively, a circuit could be implemented using any other suitable components, digital or analog, capable of performing these basic operations (e.g. digital signal processors, microcontrollers, microprocessors, etc.), or could be implemented in software. Indeed, the outputs of the circuit described in FIG. 4 may be expressed mathematically in terms of the input red, $R_{in}$, the input blue, $B_{in}$, the input green, $G_{in}$, and a fraction f, where $0<f<1$:

$$R_{out}=R_{in}$$

$$G_{out}=f\times(R_{in}-G_{in})+G_{in}$$

$$B_{out}=f\times(R_{in}-G_{in})+B_{in}$$

As understood by those of skill in the art, such outputs may be provided, generated, or otherwise created by any suitable combination of circuit elements, hardware, and/or software.

In one example, an image is modified at a 0.4 level, which corresponds to red pixel desaturatation by having 40% green and 40% blue added. Since both the added blue light and green light cancel L (red) cone activity, the total ratio L (red) to M (green) cones activity is reduced to about 125%. At the 0.4 level, a child (or individual with a developing eye) would need to play about four hours of video games in order to induce the same amount of myopia that normal viewing would produce in 1 hour. Put another way, if prolonged video game exposure through adolescence typically produced an estimate of −5 diopters of myopic defocus (moderately high myopia), myopic defocus would be reduced to only −1.25 diopters if the child had been restricted to watching 0.4 level displays. At the 0.4 level, images look different but not drastically. Furthermore, if a viewer was never shown the original image, the 0.4 level image would most likely not appear distorted.

In another example, an image is modified at a 0.6 level, which corresponds to red pixel desaturation by having 60% green and 60% blue added. At the higher level of 0.6, 60% blue and 60% green have been added to image areas that would have had 100% Red in the original. This level has been estimated to be almost completely myopia safe.

Figure 6:
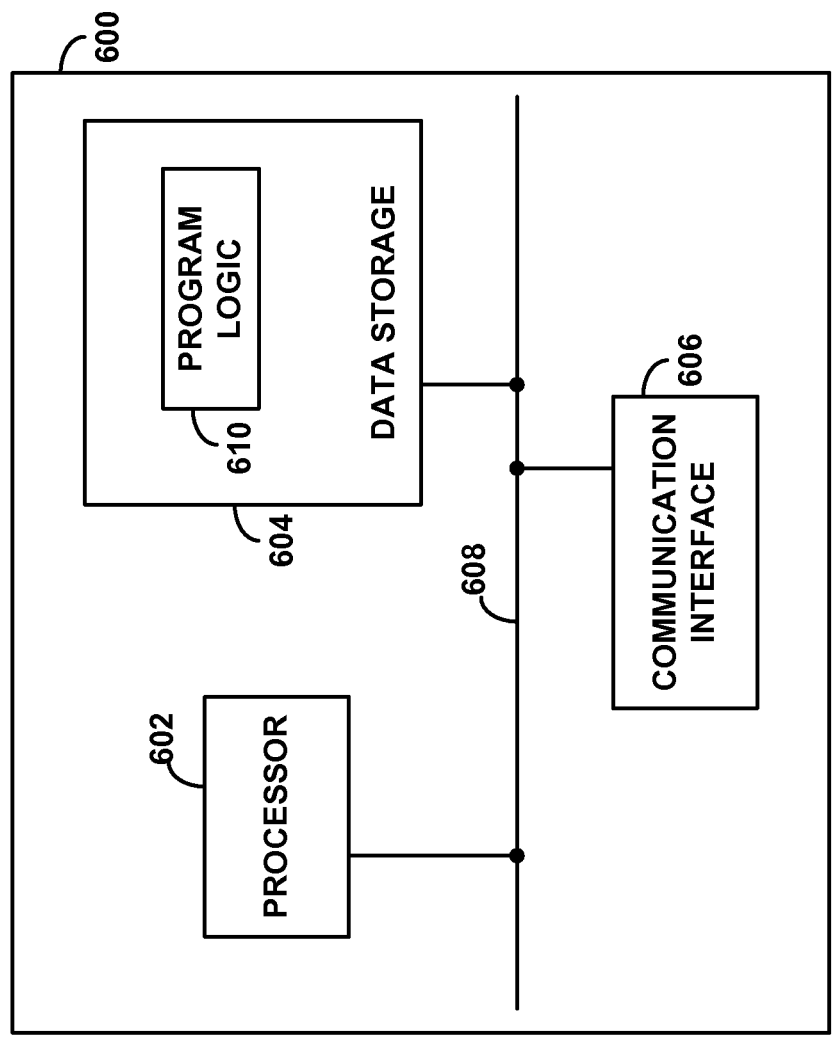
FIG. 6 is a block diagram of an example computing device capable of implementing example embodiments.

FIG. 6 is a block diagram of an example computing device 600 capable of implementing the embodiments described above and other embodiments. Example computing device 600 includes a processor 602, data storage 604, and a communication interface 606, all of which may be communicatively linked together by a system bus, network, or other mechanism 608. Processor 602 may comprise one or more general purpose processors (e.g., INTEL microprocessors) or one or more special purpose processors (e.g., digital signal processors, etc.) Communication interface 606 may allow data to be transferred between processor 602 and input or output devices or other computing devices, perhaps over an internal network or the Internet. Instructions and/or data structures may be transmitted over the communication interface 606 via a propagated signal on a propagation medium (e.g., electromagnetic wave(s), sound wave(s), etc.). Data storage 604, in turn, may comprise one or more storage components or physical and/or non-transitory computer-readable media, such as magnetic, optical, or organic storage mechanisms, and may be integrated in whole or in part with processor 602. Data storage 604 may contain program logic 610.

Program logic 610 may comprise machine language instructions or other sorts of program instructions executable by processor 602 to carry out the various functions described herein. For instance, program logic 610 may define logic executable by processor 602, to receive video display channel inputs, to adjust those inputs according to the methods of the invention, and to output the adjusted video display channels. In alternative embodiments, it should be understood that these logical functions can be implemented by firmware or hardware, or by any combination of software, firmware, and hardware.

Figure 5:
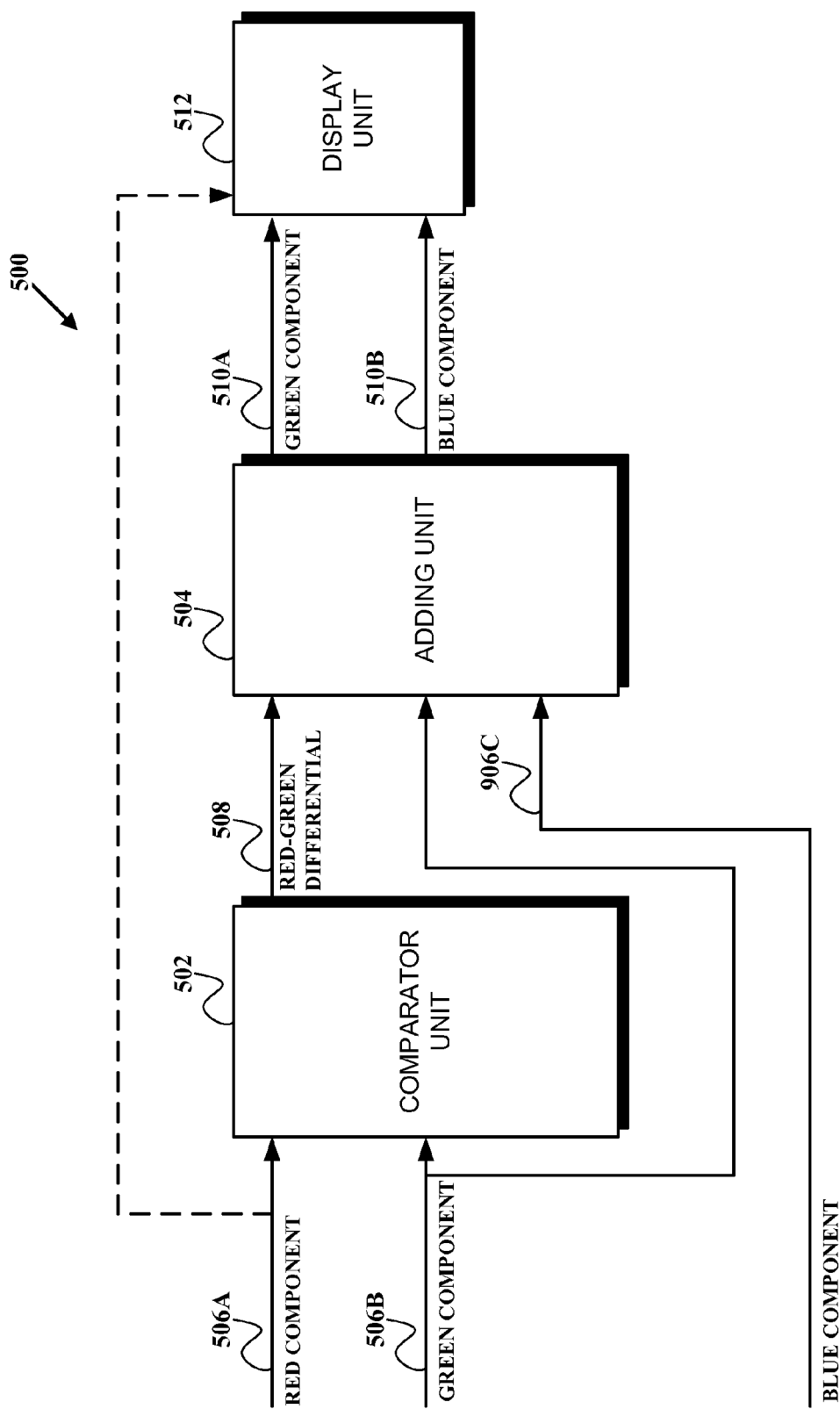
FIG. 5 shows a functional block diagram of an example device, in accordance with an example embodiment.

FIG. 5 shows a block diagram of functional components of an example device 500 for creating video signals. As will be understood by those of skill in the art, the functional components shown in FIG. 5 may be implemented as various circuits, hardware, software, or combinations thereof. Further certain functional components of example device 500 may be added, removed, and/or rearranged. In particular, although example device 500 is shown as including display unit 512, this is not necessary. In an embodiment, the device need not include such a display unit; various output signals provided by the device may be provided to a display that is communicatively coupled to, but otherwise remotely located from, the device.

Example device 500 includes comparator unit 502, adding unit 504, and display unit 512. In an embodiment, comparator unit 502 is configured to receive a red component input signal 506A and a green component input signal 506B. Comparator unit 502 is also configured to compare a magnitude of the red component input signal 506A and a magnitude of the green component input signal 506B. Further, comparator unit 502 is configured to output a red-green differential signal 508 when the magnitude of the red component input signal 506A is greater than at least the magnitude of the green component input signal 506B.

Comparator unit 502 may operate according to the comparing functionality described above with respect to FIG. 8 and FIG. 2, and/or may be implemented using any suitable aspects of the circuitry, computing device, or computer readable medium described above with respect to FIG. 4, FIG. 6, and/or FIG. 7, respectively. Accordingly, comparator unit 502 may output the red-green differential signal 508 when the magnitude of the red component input signal 506A is greater than the sum of the magnitude of the green component input signal 506B and a threshold value. In a particular embodiment, comparator unit 502 may include the comparators described above with respect to FIG. 4, including, for example, comparator 408 and/or comparator 414.

Example device 500 also includes adding unit 504. In an embodiment, adding unit 504 is configured to receive (i) the red-green differential signal 508, (ii) the green component input signal 506B, and (iii) a blue component input signal 506C. Adding unit 504 is also configured to output a green component output signal 510A comprising a summation of the green component input signal 506B and the red-green differential signal 508. Further, adding unit 504 is configured to output a blue component output signal 510B comprising a summation of the blue component input signal 506C and the red-green differential signal 508.

Adding unit 504 may operate according to the adding functionality described above with respect to FIG. 8 and FIG. 2, and/or may be implemented using any suitable aspects of the circuitry, computing device, or computer readable medium described above with respect to FIG. 4, FIG. 6, and/or FIG. 7, respectively. In a particular embodiment, adding unit 504 may include the adders described above with respect to FIG. 4, including, for example, adder 410 and/or adder 412.

Example device 500 may also include a scaling unit (not shown). Such a scaling unit may be situated between the comparator unit 502 and the adding unit 504. The scaling unit may be configured to receive the red-green differential signal 508 and output a varied red-green differential signal. In such a case, the signal 508 received by adding unit 504 may be the varied red-green differential signal.

The scaling unit may operate according to the scaling functionality described above with respect to FIG. 8 and FIG. 2, and/or may be implemented using any suitable aspects of the circuitry, computing device, or computer readable medium described above with respect to FIG. 4, FIG. 6, and/or FIG. 7, respectively. Accordingly, the scaling unit may include at least one of a static resistor, a variable resistor, a rheostat, a variable potentiometer, and a digitally programmable resistor. In an embodiment, the scaling unit may include resistive element 420 as described above with respect to FIG. 4.

As noted, example device 500 may also include display unit 512. In an embodiment, display unit 512 is configured to receive at least one of (i) the red component input signal 506A, (ii) the blue component output signal 510B, and (iii) the green component output signal 510A. Display unit 512 is also configured to display the received at least one of (i) the red component input signal 506A, (ii) the blue component output signal 510B, and (iii) the green component output signal 510A.

The display unit may include at least one of cathode ray tube (CRT) display, a liquid crystal display (LCD), a light-emitting diode (LED) display, an organic LED display, a plasma display and a digital light processing (DLP) display. Other examples of displays may exist as well.

Example device 500 may also include a subtracting unit (not shown). Such a subtracting unit may be situated between the comparator unit 502 and the display unit 512. The subtracting unit may be configured to receive (i) the red-green differential signal 508 and (ii) the red component input signal 506A. The subtracting unit may also configured to output a red component output signal (not shown) comprising a difference of the red component input signal and the red-green scaled-differential signal. In such a case, the display unit 512 may be configured to receive and display at least one of (i) the red component output signal, (ii) the blue component output signal 510B, and (iii) the green component output signal 510A.

Exemplary embodiments of the invention have been described above. Those skilled in the art will understand, however, that changes and modifications may be made to the embodiments described without departing from the true scope and spirit of the invention. For example, the depicted flow charts may be altered in a variety of ways. For instance, the order of the steps may be rearranged, steps may be performed in parallel, steps may be omitted, or other steps may be included. Accordingly, the disclosure is not limited except as by the appended claims. All embodiments of the invention may be combined in any combination unless the context clearly dictates otherwise.

We claim:

1. A method for creating video signals comprising:
   (a) receiving an input video signal comprising an input red component, an input green component, and an input blue component;
   (b) generating an output video signal comprising an output red component, an output green component, and an output blue component based on a magnitude of the input red component, a magnitude of the input green component, and a magnitude of the input blue component; and
   (c) sending the output video signal,
   wherein,
   a differential between a magnitude of the output red component and a magnitude of the output green component is reduced compared to a differential between the magnitude of the input red component and the magnitude of the input green component when the magnitude of the input red component is greater than the magnitude of the input green component, and
   the differential between the magnitude of the output red component and the output green component is unchanged when the magnitude of the input red component is not greater than the magnitude of the input green component.

2. The method of claim 1, wherein the magnitude of the output green component is increased by a fractional amount relative to the magnitude of the input green component based on the differential between the magnitudes of the input red and the input green components, and a magnitude of the output blue component is increased by a fractional amount relative to a magnitude of the input blue component based on the differential between the magnitudes of the input red and the input green components.

3. The method of claim 2, wherein the magnitude of the output green component and the magnitude of the output blue component are increased by the same fractional amount.

4. The method of claim 2, wherein the magnitude of the output green component and the magnitude of the output blue component are increased by different, respective, fractional amounts.

5. The method of claim 1, wherein the magnitude of the output red component is the same as the magnitude of the input red component.

6. The method of claim 1, wherein the magnitude of the output red component is decreased by a fractional amount relative to the magnitude of the input red component based on the differential.

7. The method of claim 1, the method further comprising:
before step (c), determining that the differential between the magnitude of the input red component and the input green component is greater than a predetermined threshold.

8. The method of claim 1, wherein generating the output video signal comprises comparing a magnitude of the input red component to a magnitude of the input green component.

9. The method of claim 1, wherein sending the output video signal comprises reducing a magnitude of the output red component relative to the magnitude of the input red component in order to reduce the differential between the magnitude of the output red component and the output green component when the magnitude of the input red component is greater than the magnitude of the input green component.

10. The method of claim 9, wherein the magnitude of the output red component is reduced by an amount proportional to the differential between the magnitude of the input red component and the magnitude of the input green component.

11. The method of claim 10, wherein the magnitude of the output red component is reduced by up to 45% of the differential between the magnitude of the input red component and the magnitude of the input green component.

12. The method of claim 10, wherein the magnitude of the output red component is reduced by 46% or more of the differential between the magnitude of the input red component and the magnitude of the input green component.

13. The method of claim 1, wherein sending the output video signal comprises increasing a magnitude of the output green component relative to the magnitude of the input green component in order to reduce the differential between the magnitude of the output red component and the output green component when the magnitude of the input red component is greater than the magnitude of the input green component.

14. The method of claim 13, wherein the magnitude of the output green component is increased by an amount proportional to the differential between the magnitude of the input red component and the magnitude of the input green component.

15. The method of claim 14, wherein the magnitude of the output green component is increased by up to 45% of the differential between the magnitude of the input red component and the magnitude of the input green component.

16. The method of claim 14, wherein the magnitude of the output green component is increased by 46% or more of the differential between the magnitude of the input red component and the magnitude of the input green component.

17. The method of claim 1, wherein sending the output video signal comprises increasing a magnitude of the output blue component relative to the magnitude of the input blue component when the magnitude of the input red component is greater than the magnitude of the input green component.

18. The method of claim 1, wherein the magnitudes of the output red component and the output green component are unchanged relative to the magnitudes of the input red component and input green component, respectively, when the magnitude of the input red component is not greater than the magnitude of the input green component.

19. The method of claim 18, wherein a magnitude of the output blue component is unchanged relative to a magnitude of the input blue component when the magnitude of the input red component is not greater than the magnitude of the input green component.

20. The method of claim 1, further comprising using a display unit to display images based on the output video signals.

21. The method of claim 20, wherein the display unit comprises a display selected from the group consisting of a cathode ray tube display, a liquid crystal display, an organic light emitting diode display, a plasma display, and a digital light processing display.

22. The method of claim 1, wherein, when displaying a video image based on the output video signals, the video image has a reduced activity differential between L and M cones in a viewer compared to the video image based on the input video signals.

23. The method of claim 22, wherein the output video signals sufficiently reduce the activity differential between L and M cones in the viewer to reduce myopia-genic properties of a display compared with the input video signals.

24. The method of claim 1, wherein, when displaying a video image based on the output video signals, the video image has a reduced red saturation for every video image compared to the video image based on the input video signals.

25. The method of claim 1, wherein, the output video signal is generated such that, for every pixel, for any combination of the input red, green, and blue components, the following relationship is true:

$$Ro\text{-}Go \leq Ri\text{-}Gi, \text{ wherein}$$

Ro is the magnitude of the output red component;
Go is the magnitude of the output green component;
Ri is the magnitude of the input red component; and
Gi is the magnitude of the input green component.

26. A non-transitory computer-readable medium having program instructions stored thereon that are executable by at least one processor, the program instructions comprising:
(a) instructions for receiving an input video signal comprising an input red component, an input-green component, and an input-blue component;
(b) instructions for generating an output video signal comprising an output red component, an output green component, and an output blue component based on a magnitude of the input red component, a magnitude of the input green component, and a magnitude of the input blue component; and
(c) instructions for sending the output video signal, wherein,
a differential between a magnitude of the output red component and a magnitude of the output green component is reduced compared to a differential between the magnitude of input red component and the magnitude of the input green component when the magnitude of the input red component is greater than the magnitude of the input green component, and the differential between the magnitude of the output red component and the output green component is unchanged when the magnitude of the input red component is not greater than the magnitude of the input green component.

27. The non-transitory computer-readable medium of claim 26, wherein the magnitude of the output green component is increased by a fractional amount relative to the magnitude of the input green component based on the differential between the magnitudes of the input red and the input green components, and a magnitude of the output blue component is increased by a fractional amount relative to the magnitude of the input blue component based on the differential between the magnitudes of the input red and the input green components.

28. The non-transitory computer-readable medium of claim 27, wherein the magnitude of the output green component and the magnitude of the output blue component are increased by the same fractional amount.

29. The non-transitory computer-readable medium of claim 27, wherein the magnitude of the output green component and the magnitude of the output blue component are increased by different, respective, fractional amounts.

30. The non-transitory computer-readable medium of claim 26, wherein, when displaying a video image based on the output video signals, the video image has a reduced activity differential between L and M cones in a viewer compared to the video image based on the input video signals.

31. The non-transitory computer-readable medium of claim 30, wherein the output video signals sufficiently reduce the activity differential between L and M cones in the viewer to reduce myopia-genic properties of a display compared with the input video signals.

32. The non-transitory computer-readable medium of claim 26, wherein, when displaying a video image based on the output video signals, the video image has a reduced red saturation for every video image compared to the video image based on the input video signals.

33. The non-transitory computer-readable medium of claim 26, wherein the output video signal is generated such that, for every pixel, for any combination of the input red, green, and blue components, the following relationship is true:

$Ro-Go \leq Ri-Gi$, wherein

Ro is the magnitude of the output red component;
Go is the magnitude of the output green component;
Ri is the magnitude of the input red component; and
Gi is the magnitude of the input green component.

34. A circuit for creating video signals, comprising:
a first comparator configured to (i) receive a red component input signal and a green component input signal and (ii) output a red-green differential signal comprising a difference of the red component input signal and the green component input signal;
a second comparator configured to (i) receive the red-green differential signal and an output signal of the second comparator and (ii) output a red-green scaled differential signal only when the red component input signal is of a greater magnitude than the green component input signal;
a first adder configured to (i) receive the green component input signal and the red-green scaled-differential signal and (ii) output a green component output signal comprising a summation of the green component input signal and the red-green scaled-differential signal; and
a second adder configured to (i) receive a blue component input signal and the red-green scaled-differential signal and (ii) output a blue component output signal comprising a summation of the blue component input signal and the red-green scaled differential signal.

35. The circuit of claim 34, wherein the red-green differential signal received by the first adder and the second adder is a varied red-green differential signal, the circuit further comprising:
a resistive element configured to receive the red-green differential signal and output the red-green scaled differential signal.

36. The circuit of claim 35, wherein the resistive element is one of a static resistor, a variable resistor, a rheostat, a variable potentiometer, and a digitally programmable resistor.

37. A device for creating video signals, comprising:
a comparator unit configured to:
receive a red component input signal and a green component input signal;
compare a magnitude of the red component input signal and a magnitude of the green component input signal; and
output a red-green differential signal only when the magnitude of the red component input signal is greater than at least the magnitude of the green component input signal; and
an adding unit configured to:
receive (i) the red-green differential signal, (ii) the green component input signal, and (iii) a blue component input signal;
output a green component output signal comprising a summation of the green component input signal and the red-green differential signal; and
output a blue component output signal comprising a summation of the blue component input signal and the red-green differential signal.

38. The device of claim 37, wherein the comparator unit outputs the red-green differential signal when the magnitude of the red component input signal is greater than the sum of the magnitude of the green component input signal and a threshold value.

39. The device of claim 37, wherein the red-green differential signal received by the adding unit is a varied red-green differential signal, the device further comprising:
a scaling unit configured to receive the red-green differential signal and output the varied red-green differential signal.

40. The device of claim 39, wherein the scaling unit comprises at least one of a static resistor, a variable resistor, a rheostat, a variable potentiometer, and a digitally programmable resistor.

41. The device of claim 37, further comprising:
a display unit configured to:
receive at least one of (i) the red component input signal, (ii) the blue component output signal, and (iii) the green component output signal; and
display the received at least one of (i) the red component input signal,
(ii) the blue component output signal, and (iii) the green component output signal.

42. The device of claim 37, further comprising:
a subtracting unit configured to:
receive (i) the red-green differential signal and (ii) the red component input signal; and output a red component output signal comprising a difference of the red component input signal and the red-green differential signal.

43. The device of claim 37, wherein, when displaying a video image based on the output signals, the video image has a reduced activity differential between L and M cones in a viewer compared to the video image based on the input signals.

44. The device of claim 43, wherein the output signals sufficiently reduce the activity differential between L and M cones in the viewer to reduce myopia-genic properties of a display compared with the input signals.

45. The device of claim 37, wherein, when displaying a video image based on the output signals, the video image has a reduced red saturation for every video image compared to the video image based on the input signals.

46. The device of claim 37, wherein the output video signal is generated such that, for every pixel, for any combination of the input red, green, and blue components, the following relationship is true:

$$Ro\text{-}Go \leq Ri\text{-}Gi, \text{ wherein}$$

Ro is the magnitude of the output red component;
Go is the magnitude of the output green component;
Ri is the magnitude of the input red component; and
Gi is the magnitude of the input green component.

* * * * *